United States Patent
Igarashi

(10) Patent No.: US 12,492,366 B2
(45) Date of Patent: Dec. 9, 2025

(54) BIOLOGICAL COMPONENT TREATMENT SYSTEM, BIOLOGICAL COMPONENT TREATMENT DEVICE, AND CELL CULTURING METHOD

(71) Applicant: TERUMO KABUSHIKI KAISHA, Tokyo (JP)

(72) Inventor: Masatsugu Igarashi, Shizuoka (JP)

(73) Assignee: TERUMO KABUSHIKI KAISHA, Tokyo (JP)

(*) Notice: Subject to any disclaimer, the term of this patent is extended or adjusted under 35 U.S.C. 154(b) by 893 days.

(21) Appl. No.: 17/631,928

(22) PCT Filed: Jul. 29, 2020

(86) PCT No.: PCT/JP2020/029080
§ 371 (c)(1),
(2) Date: Feb. 1, 2022

(87) PCT Pub. No.: WO2021/024881
PCT Pub. Date: Feb. 11, 2021

(65) Prior Publication Data
US 2022/0251495 A1    Aug. 11, 2022

(30) Foreign Application Priority Data
Aug. 2, 2019 (JP) ................................. 2019-143078

(51) Int. Cl.
*C12M 1/34* (2006.01)
*C12M 1/00* (2006.01)

(52) U.S. Cl.
CPC ............ *C12M 41/32* (2013.01); *C12M 23/14* (2013.01); *C12M 23/40* (2013.01); *C12M 29/10* (2013.01); *C12M 41/36* (2013.01)

(58) Field of Classification Search
CPC ...... C12M 41/32; C12M 23/14; C12M 23/58; C12M 29/16; C12M 33/07
See application file for complete search history.

(56) References Cited

U.S. PATENT DOCUMENTS

| | | | |
|---|---|---|---|
| 4,629,686 A | 12/1986 | Gruenberg | |
| 4,829,002 A | 5/1989 | Pattillo et al. | |
| 10,113,143 B2 | 10/2018 | Iino et al. | |
| 2015/0268224 A1 | 9/2015 | Yaakov et al. | |
| 2015/0329817 A1 | 11/2015 | Namatame et al. | |
| 2017/0101618 A1 | 4/2017 | Kamen et al. | |

FOREIGN PATENT DOCUMENTS

EP    2141226    1/2010

OTHER PUBLICATIONS

Freshney (Chapter 26: Scale-Up Automation, pp. 497-515, Book: Culture of Animal Cells, 6th edition, ISBN 978-0-470-52812-9, 2010). (Year: 2010).*
International Search Report prepared by the European Patent Office for International (PCT) Patent Application No. PCT/JP2020/029080, dated Nov. 9, 2020, 4 pages.
Written Opinion prepared by the European Patent Office for International (PCT) Patent Application No. PCT/JP2020/029080, dated Nov. 9, 2020, 6 pages.

* cited by examiner

*Primary Examiner* — Emily A Cordas
*Assistant Examiner* — Matasha Dhar
(74) *Attorney, Agent, or Firm* — Sheridan Ross P.C.

(57) ABSTRACT

A biological component treatment system is equipped with a biological component kit having a path through which a culture medium is capable of flowing, and a biological component treatment device that controls a flowing state of the culture medium. A method for culturing cells includes performing a measurement of information in relation to lactic acid, calculating a number of cells during culturing of cells on the basis of the obtained information in relation to lactic acid and calibration information, and controlling supply of the culture medium to the cells on the basis of the number of cells.

8 Claims, 8 Drawing Sheets

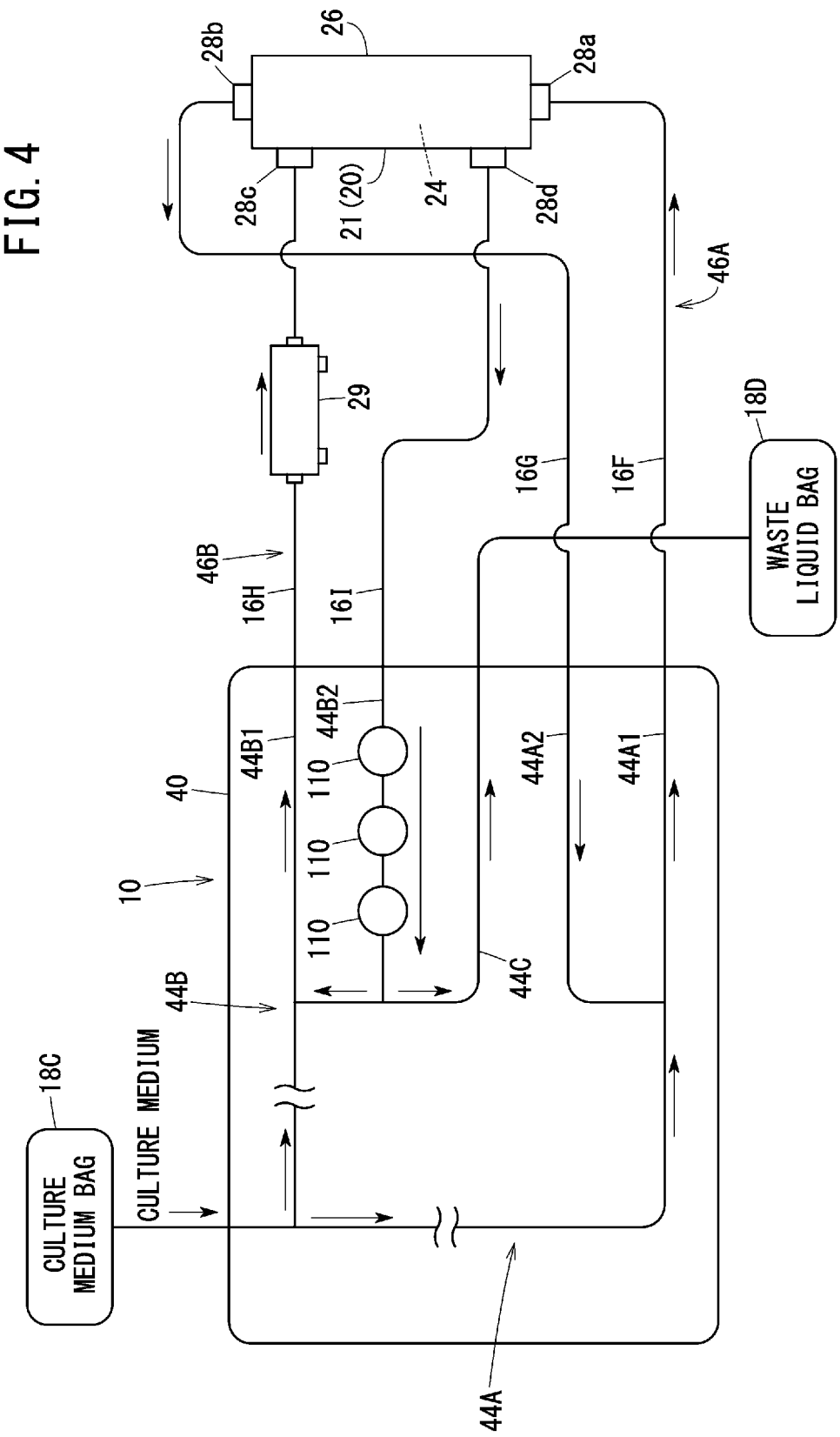

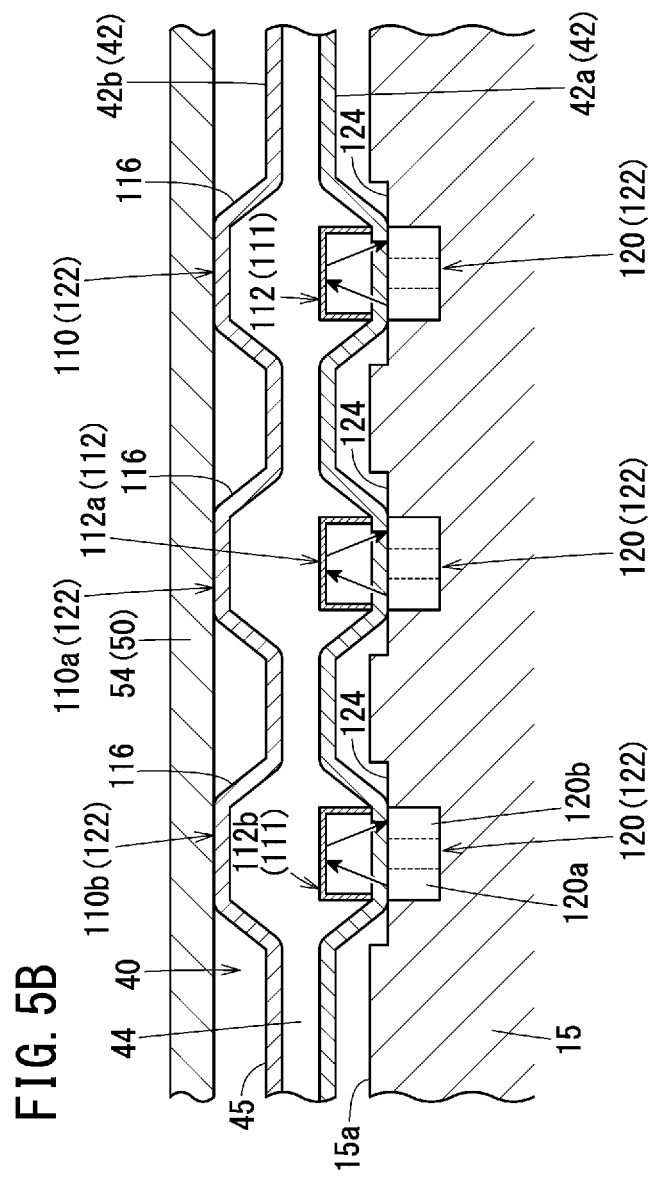
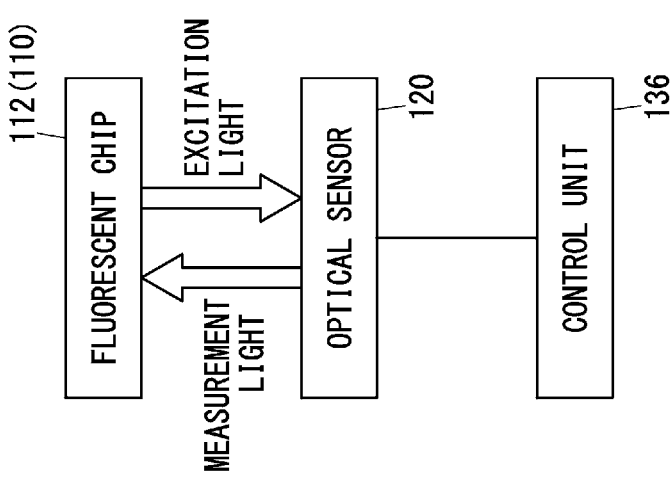

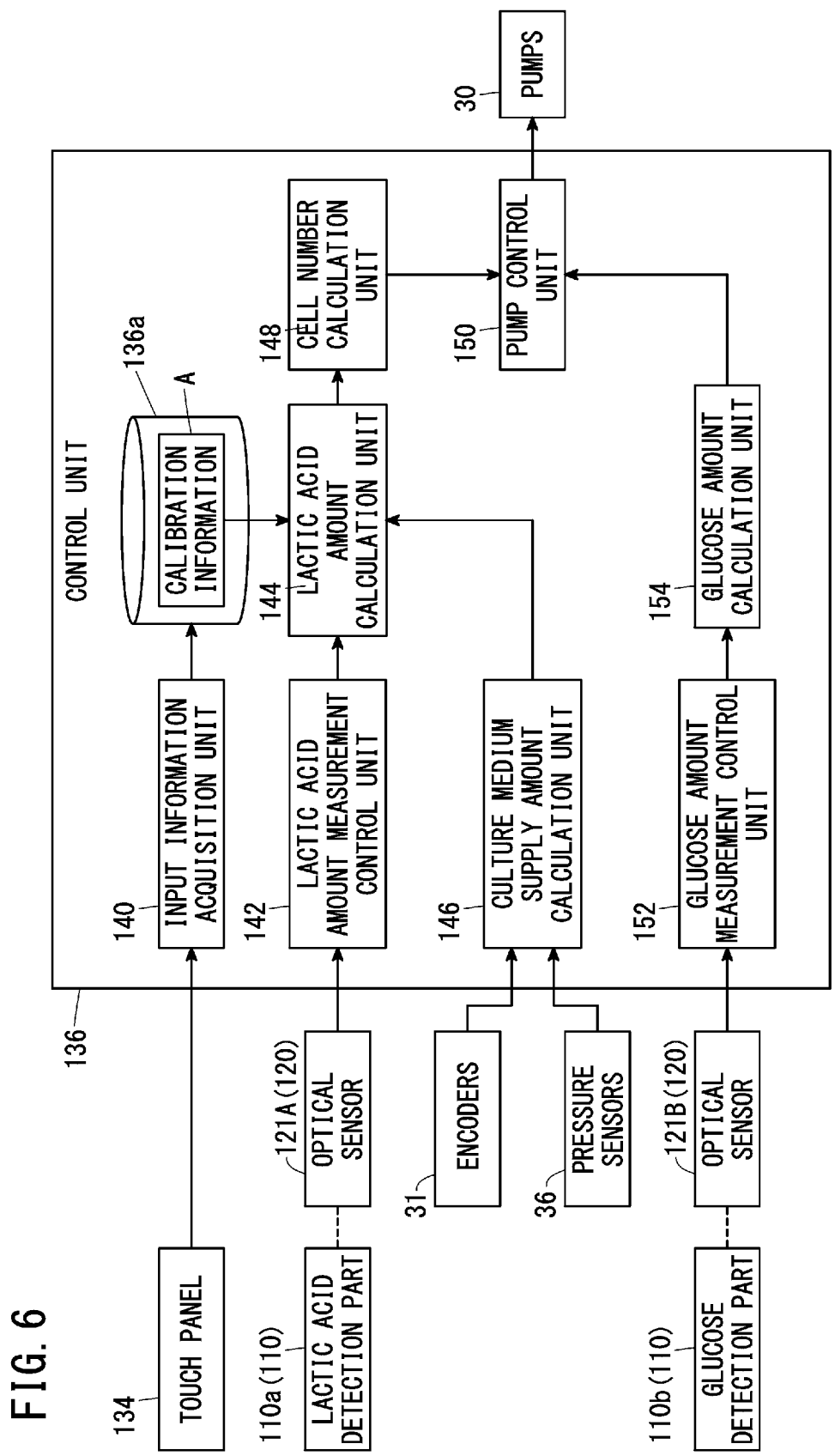

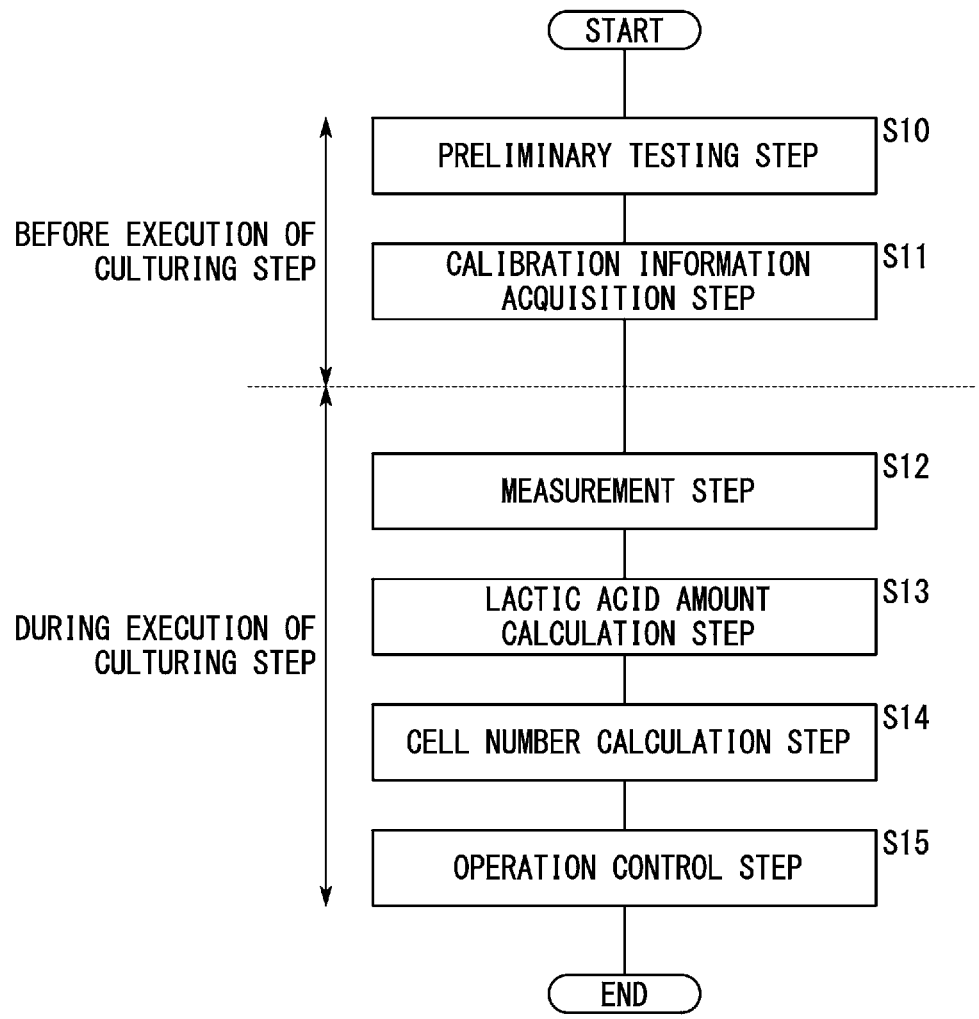

BIOLOGICAL COMPONENT TREATMENT SYSTEM, BIOLOGICAL COMPONENT TREATMENT DEVICE, AND CELL CULTURING METHOD

CROSS REFERENCE TO RELATED APPLICATIONS

This application is a national stage application under 35 U.S.C. 371 and claims the benefit of PCT Application No. PCT/JP2020/029080 having an international filing date of 29 Jul. 2020, which designated the United States, which PCT application claimed the benefit of Japanese Patent Application No. 2019-143078 filed 2 Aug. 2019, the entire disclosures of each of which are hereby incorporated herein by reference, in their entireties, for all that they teach and for all purposes.

TECHNICAL FIELD

The present invention relates to a biological component treatment system in which cells are cultured by flow of a culture medium, a biological component treatment device used in such a biological component treatment system, and a cell culturing method performed when culturing cells.

In the practice of regenerative medicine, a treatment is performed in which biological cells (biological components) are collected and cultured, and the cultured cells are administered to a patient. In a cell expansion process for culturing cells, for example, as disclosed in Japanese Laid-Open Patent Publication No. 2017-143775, a cell culture system (biological component treatment system), in which there is employed a cell culture container (bioreactor) having hollow fibers inside a case, is used. In such a biological component treatment system, in a state in which a biological component kit having a plurality of medical bags and the bioreactor is set in a device, a liquid containing cells is supplied into the hollow fibers, the cells are made to adhere to the interior of the hollow fibers, and thereafter the cells are made to undergo cell expansion by further delivering a culture medium into the cell culture container.

SUMMARY OF INVENTION

Incidentally, the cells consume glucose contained in the culture medium as a nutrient (energy), and release lactic acid into the culture medium. Accordingly, in a culturing step of culturing cells, it is necessary to increase a supplied amount of the culture medium (glucose) in accordance with an increase in the number of cells. However, conventionally, in the culturing step, the control does not go beyond a control of gradually increasing in a stepwise manner the supplied amount of the culture medium in accordance with the passage of time. Accordingly, a problem arises in that the number of cells obtained in the cell expansion process of the system tends to be sporadic, and the product quality as a manufactured product is not stable.

More specifically, in the cell culturing process, it is desirable to appropriately manage the expansion degree of the cells (the number of cells, etc.) and to stabilize the product quality thereof, together with suppressing wasteful usage of the culture medium, by appropriately adjusting the amounts of the culture medium and a gas component supplied to the bioreactor.

The present invention has been devised in relation to the aforementioned technique, and relates to a biological component treatment system, a biological component treatment device, and a cell culturing method in which, by controlling the supply of a culture medium to the cells on the basis of information in relation to lactic acid at a time of cell culturing, it is possible to stabilize product quality together with reducing manufacturing costs.

In order to achieve the aforementioned object, a first aspect of the present invention is a biological component treatment system, including a biological component kit having a path through which a culture medium for culturing cells is allowed to flow, and a biological component treatment device in which the biological component kit is set, and which is configured to control a flowing state of the culture medium, wherein the biological component treatment device includes a measurement unit configured to perform a measurement of information in relation to lactic acid contained in the culture medium, on the biological component kit, and a control unit configured to calculate a number of cells during culturing of the cells, based on the information in relation to lactic acid obtained by the measurement of the measurement unit, and calibration information that is stored in advance, and further configured to control supply of the culture medium to the cells based on the number of cells.

Further, in order to achieve the aforementioned object, a second aspect of the present invention is a biological component treatment device in which a biological component kit is set, the biological component kit having a path through which a culture medium for culturing cells is allowed to flow, the biological component treatment device being configured to control a flowing state of the culture medium, wherein the biological component treatment device includes a measurement unit configured to perform a measurement of information in relation to lactic acid contained in the culture medium, on the biological component kit, and a control unit configured to calculate a number of cells during culturing of the cells, based on the information in relation to lactic acid obtained by the measurement of the measurement unit, and calibration information that is stored in advance, and further configured to control supply of the culture medium to the cells based on the number of cells.

Further still, in order to achieve the aforementioned object, a third aspect of the present invention is a cell culturing method performed by a biological component treatment system, including a biological component kit having a path through which a culture medium for culturing cells is allowed to flow, and a biological component treatment device in which the biological component kit is set, and which is configured to control a flowing state of the culture medium, wherein the cell culturing method includes a measurement step of performing, by a measurement unit of the biological component treatment device, a measurement of information in relation to lactic acid contained in the culture medium, on the biological component kit, a cell number calculation step of calculating, by a control unit of the biological component treatment device, a number of cells during culturing of cells, based on the information in relation to lactic acid obtained by the measurement of the measurement unit, and calibration information that is stored in advance, and an operation control step of controlling, by the control unit, supply of the culture medium to the cells based on the number of cells.

In the above-described biological component treatment system, the biological component treatment device, and the cell culturing method, by controlling the supply of the culture medium to the cells on the basis of the information

BRIEF DESCRIPTION OF DRAWINGS

FIG. 4 is an explanatory diagram schematically showing liquid paths of the biological component kit at a time of cell culturing;

FIG. 5A is a block diagram showing an outline of a target parameter detection part, and FIG. 5B is a side cross-sectional view showing a culture parameter detection unit in an enlarged manner;

FIG. 6 is a functional block diagram of internal elements of a control unit at a time of cell culturing;

FIG. 8 is a flowchart showing a procedure of a cell culturing method.

DESCRIPTION OF EMBODIMENTS

Preferred embodiments of the present invention will be presented and described in detail below with reference to the accompanying drawings.

Figure 1:
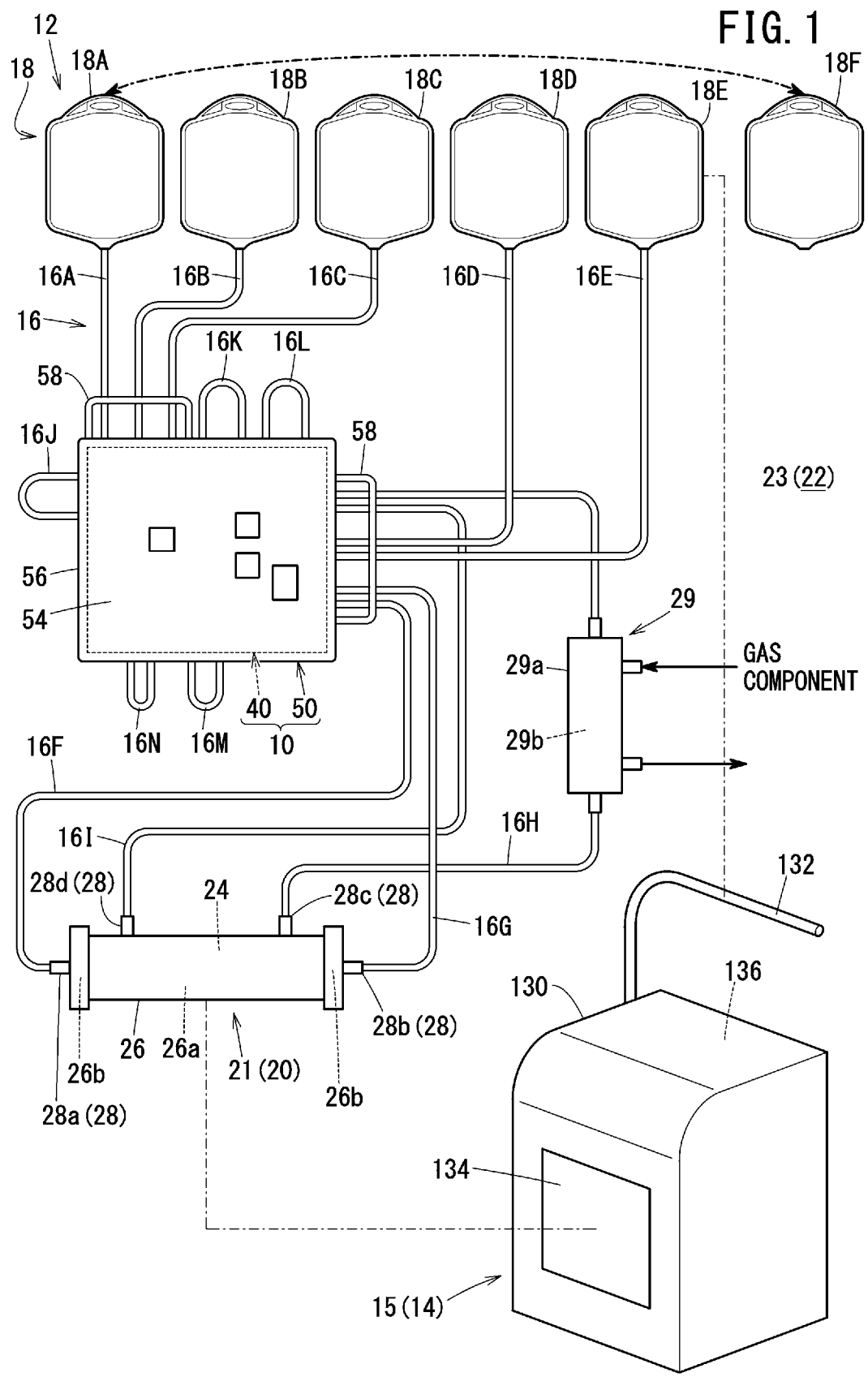
FIG. 1 is a perspective view showing a biological component treatment system to which a biological component cassette and a biological component kit according to an embodiment of the present invention are applied.

As shown in FIG. 1, a biological component treatment system 22 according to an embodiment of the present invention is equipped with a biological component kit 12 (hereinafter simply referred to as a kit 12) in which a liquid containing a biological component and a liquid for treating the biological component are capable of flowing, and a biological component treatment device 14 in which the kit 12 is set. The kit 12 includes a biological component cassette 10 (hereinafter, simply referred to as a cassette 10) in which a plurality of paths for the liquids are consolidated, and which is set in the biological component treatment device 14.

Further, the kit 12 includes, as members that constitute the plurality of paths, and in addition to the cassette 10, a plurality of tubes 16, a plurality of medical bags 18, and a treatment unit 20 in which processing is performed in the biological component treatment device 14. The kit 12 allows a plurality of types of liquids contained in each of the medical bags 18 to flow through the cassette 10 and through each of the tubes 16 under the operation of the biological component treatment device 14, and is constituted so as to obtain a target product by processing the liquids in the treatment unit 20.

In addition, the biological component treatment system 22 according to the present embodiment is used in a cell expansion process for expanding biological cells (biological components) in regenerative medicine, and a bioreactor 21 used for cell expansion is applied to the treatment unit 20 of the kit 12. Further, as the liquids that flow inside the kit 12, there may be cited a solution containing cells (hereinafter referred to as a cell solution), a culture medium (culture solution) which is supplied in order to expand the cells, a cleaning solution for cleaning the interior of the kit 12, and a releasing solution for releasing the cells. More specifically, in a set state of the kit 12, the biological component treatment device 14 carries out a cell expansion process in which the bioreactor 21 is seeded with the cell solution, and furthermore, the cells are cultured by supplying the culture medium, and thereafter, the expanded cells are released and collected from the bioreactor 21. Hereinafter, the biological component treatment device 14 may also be referred to as a cell expansion device 15, and the biological component treatment system 22 may also be referred to as a cell expansion system 23.

The biological cells are not particularly limited, and may include, for example, cells (T cells and the like) contained in blood, and stem cells (ES cells, iPS cells, mesenchymal stem cells, and the like). An appropriate culture medium may be selected according to the biological cells, and for example, as such a culture medium, there may be cited a balanced salt solution (BSS) as a basic solution, and various amino acids, vitamins, serum and the like may be added thereto in order to prepare the culture medium. Further, the cleaning solution is not particularly limited, and as examples thereof, there may be cited buffering solutions such as PBS (Phosphate Buffered Salts), TBS (Tris-Buffered Saline) and the like, or physiological saline. Further, as the releasing solution, for example, trypsin or an EDTA solution can be applied.

Among the plurality of medical bags 18 of the kit 12, there are included a cell solution bag 18A in which the cell solution is accommodated, a cleaning solution bag 18B in which the cleaning solution is accommodated, and a culture medium bag 18C in which the culture medium is accommodated. Furthermore, as the plurality of medical bags 18, the kit 12 includes empty bags, and such empty bags include a waste liquid bag 18D into which a liquid that is discarded in the cell expansion process flows, and a collection bag 18E in which cells (and other liquids) obtained in the expansion process are collected. Further, among the medical bags 18, a releasing solution bag 18F in which the releasing solution is accommodated is separately prepared. During the course of the expansion process, the releasing solution bag 18F is exchanged by the operator with one of the medical bags 18 (for example, the cell solution bag 18A) that has been connected beforehand.

The cell solution bag 18A, the cleaning solution bag 18B, and the culture medium bag 18C, etc., are aseptically joined to ends of the respective tubes 16 using a non-illustrated aseptic joining device (sterile tubing welder). Alternatively, each of the medical bags 18 may be fixed to ends of the respective tubes 16 in a non-separable manner, and may have a structure for ensuring sterility inside the kit 12. Further, alternatively, the kit 12 may apply a connection structure (not shown) that enables a detachable connection between the tubes 16 and each of the medical bags 18.

Although not particularly limited, for the bioreactor 21 of the kit 12, it is preferable to use a culture medium substrate having a large surface area, and for example, a structure having hollow fibers may be applied thereto. More specifically, the bioreactor 21 includes a plurality of the hollow fibers 24 (for example, ten thousand or greater), and a cylindrical container 26 having a main space 26a therein in which the plurality of hollow fibers 24 are accommodated.

The plurality of hollow fibers 24 include internal cavities (not shown) that penetrate along the direction of extension thereof, and the cells are cultured by becoming adhered on inner peripheral surfaces of the hollow fibers 24 that constitute the internal cavities. The hollow fibers 24 are accommodated along an axial direction of the container 26, and both ends thereof are retained by non-illustrated retaining walls. The diameters of the hollow cavities, for example, are formed on the order of approximately 200 micrometers, and communicate with end spaces 26b on both axial sides of the retaining walls.

Further, the hollow fibers 24 include a plurality of non-illustrated pores therein that enable communication between the outer side (the main space 26a) and the inner cavities of the hollow fibers 24. The pores are formed with sizes that do not allow cells and proteins to pass therethrough, but on the other hand enable solutions and substances of low molecular weight to pass therethrough. The diameter of the pores is set, for example, on the order of 0.005 to 10 micrometers. Consequently, the culture medium, a predetermined gas component, and the like are supplied via the pores to the cells that are adhered to the inner peripheral surfaces of the hollow fibers 24. Hereinafter, a configuration in which liquid is primarily circulated in the inner cavities of the hollow fibers 24 may also be referred to as an IC (intra capillary) configuration, and a configuration in which liquid is primarily circulated on outer sides of the hollow fibers 24 may also be referred to as an EC (extra capillary) configuration.

The material constituting the hollow fibers 24 is not particularly limited, and as examples thereof, there may be cited polyolefin resins such as polypropylene, polyethylene and the like, and polymer materials such as polysulfone, polyether sulfone, polyacrylonitrile, polytelorafluoroethylene, polystyrene, polymethylmethacrylate, cellulose acetate, cellulose triacetate, regenerated cellulose, and the like.

The container 26 has an axial length which is capable of accommodating the hollow fibers 24 in a state that the hollow fibers are extended in a substantially linear shape. The container 26 is equipped with four terminals 28 (a first IC terminal 28a, a second IC terminal 28b, a first EC terminal 28c, and a second EC terminal 28d) that are connected respectively to the tubes 16. The first IC terminal 28a is provided at one end of the container 26 and communicates with the end space 26b on one end side. The second IC terminal 28b is provided at another end of the container 26 and communicates with the end space 26b on another end side. The first EC terminal 28c is provided on an outer peripheral surface of the container 26 in the vicinity of the other end side, and communicates with the main space 26a at a location in proximity to the other end. The second EC terminal 28d is provided on an outer peripheral surface of the container 26 in the vicinity of the one end side, and communicates with the main space 26a at a location in proximity to the one end.

The plurality of tubes 16 of the kit 12 include a cell solution tube 16A connected between the cell solution bag 18A and the cassette 10, a cleaning solution tube 16B connected between the cleaning solution bag 18B and the cassette 10, a culture medium tube 16C connected between the culture medium bag 18C and the cassette 10, a waste liquid tube 16D connected between the waste liquid bag 18D and the cassette 10, a collection tube 16E connected between the collection bag 18E and the cassette 10, a first IC tube 16F connected between the first IC terminal 28a of the bioreactor 21 and the cassette 10, a second IC tube 16G connected between the second IC terminal 28b of the bioreactor 21 and the cassette 10, a first EC tube 16H connected between the first EC terminal 28c of the bioreactor 21 and the cassette 10, and a second EC tube 16I connected between the second EC terminal 28d of the bioreactor 21 and the cassette 10.

A gas exchanger 29 that mixes a predetermined gas component with a liquid (the culture medium) is provided at an intermediate position of the first EC tube 16H. As an example of the gas component to be mixed, there may be cited a gas component that approximates the mixing ratio of natural air (nitrogen $N_2$: 75%, oxygen $O_2$: 20%, and carbon dioxide $CO_2$: 5%).

The structure of the gas exchanger 29 is not particularly limited, and in the same manner as the bioreactor 21, a structure can be applied in which a plurality of hollow fibers 29b are provided inside a container 29a. More specifically, the gas exchanger 29 guides the liquid flowing through the first EC tube 16H, into the inner cavities of the hollow fibers 29b, and during movement thereof inside the hollow fibers 29b, the gas component that is supplied to the interior of the container 29a (the space on the outer side of the hollow fibers 29b) is mixed with the liquid through the pores of the hollow fibers 29b.

In addition, by joining the aforementioned tubes 16 in advance, the cassette 10, which is one component of the kit 12, functions as a relay unit through which the cell solution, the cleaning solution, the culture solution, and the releasing solution of the respective medical bags 18 are allowed to flow to a different medical bag 18 or to the bioreactor 21. When the kit 12 is set in the cell expansion device 15, the cassette 10 is mounted in a cassette setting location inside the cell expansion device 15, which simplifies the wiring operation of the tubes 16 in the cell expansion process.

Figure 2:
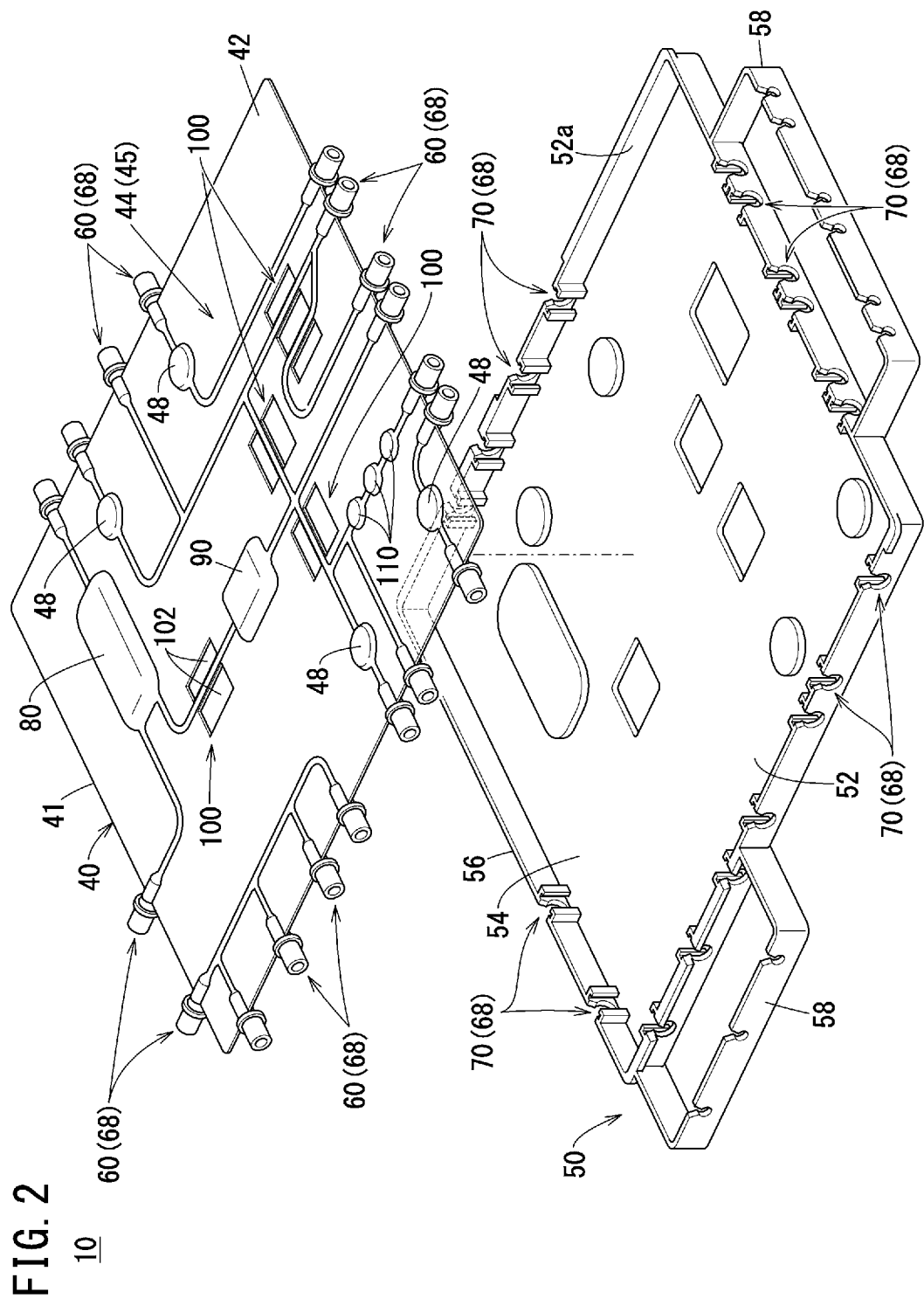
FIG. 2 is an exploded perspective view of the biological component cassette.

As shown in FIG. 2, the cassette 10 according to the present embodiment includes a soft cassette main body 40 to which the plurality of tubes 16 are directly connected, and a rigid frame 50 that retains the cassette main body 40 and is fixed to the cell expansion device 15.

The cassette main body 40 exhibits a substantially rectangular shape, and is formed in a thin sheet shape which possesses flexibility. The cassette main body 40 is formed by stacking and joining (fusion bonding) together two resin sheets 42 made of a resin material in a thickness direction. In the fusion bonding of the pair of resin sheets 42, gas is supplied to and discharged between the pair of resin sheets 42 along grooves that are formed in a fusion bonding mold, whereby flow path walls 45, in which the resin sheets 42 are raised and protrude with semicircular shapes in cross-section, and flow paths 44 are formed on the inner sides thereof. The material constituting the resin sheets 42 is not particularly limited, insofar as it possesses flexibility that is capable of being deformed by the pressure of the liquids, and for example, a vinyl chloride resin, a polyolefin resin, a polyurethane resin, or the like may be applied thereto. An embossing process may be implemented on the surface of the cassette main body 40, and fine convex/concave irregularities may be formed therein. A plurality of connectors 60 for connection between the plurality of tubes 16 and the flow paths 44 are provided on outer edges 41 of the cassette main body 40.

On the other hand, the frame 50 is constituted by a resin material that is harder (having a greater modulus of elasticity) than the cassette main body 40, and is formed in a thin recessed shape having an accommodation space 52 therein in which the cassette main body 40 is accommodated. The constituent material of the frame 50 is not limited to any particular material, however, there may preferably be used a thermoplastic resin material, for example, polypropylene, polycarbonate, polyamide, polysulfone, polyarylate, methacrylate-butylene-styrene copolymer, or the like.

The frame 50 includes a substantially rectangular shaped cover portion 54 which is slightly larger than the cassette main body 40, and side portions 56 that protrude a short distance from the outer periphery of the cover portion 54 in a direction perpendicular to the cover portion 54. The side portions 56 extend around the entire outer periphery of the cover portion 54. In the frame 50, the accommodation space 52 is opened through an opening 52a surrounded by the side portions 56 on an opposite side from the cover portion 54, thereby causing one surface of the cassette main body 40 to be exposed. Further, the frame 50 includes a retaining frame 58 that extends outward from each of the upper side and the right side of the side portions 56 and that retains the tubes 16 which are separated a predetermined distance from the side portions 56. Engaging portions 70 in which the respective connectors 60 are arranged and retained therein are provided in the side portions 56 at positions corresponding to the respective connectors 60 of the cassette main body 40. The connectors 60 and the engaging portions 70 constitute engagement mechanisms 68 for engagement with the cassette main body 40.

The aforementioned engagement mechanisms 68 are disposed respectively on four sides of the substantially rectangular shaped cassette 10. Consequently, the frame 50 retains the sheet-shaped cassette main body 40 in a stretched state, and suitably causes the flow paths 44 to be extended along a planar direction.

Figure 3:
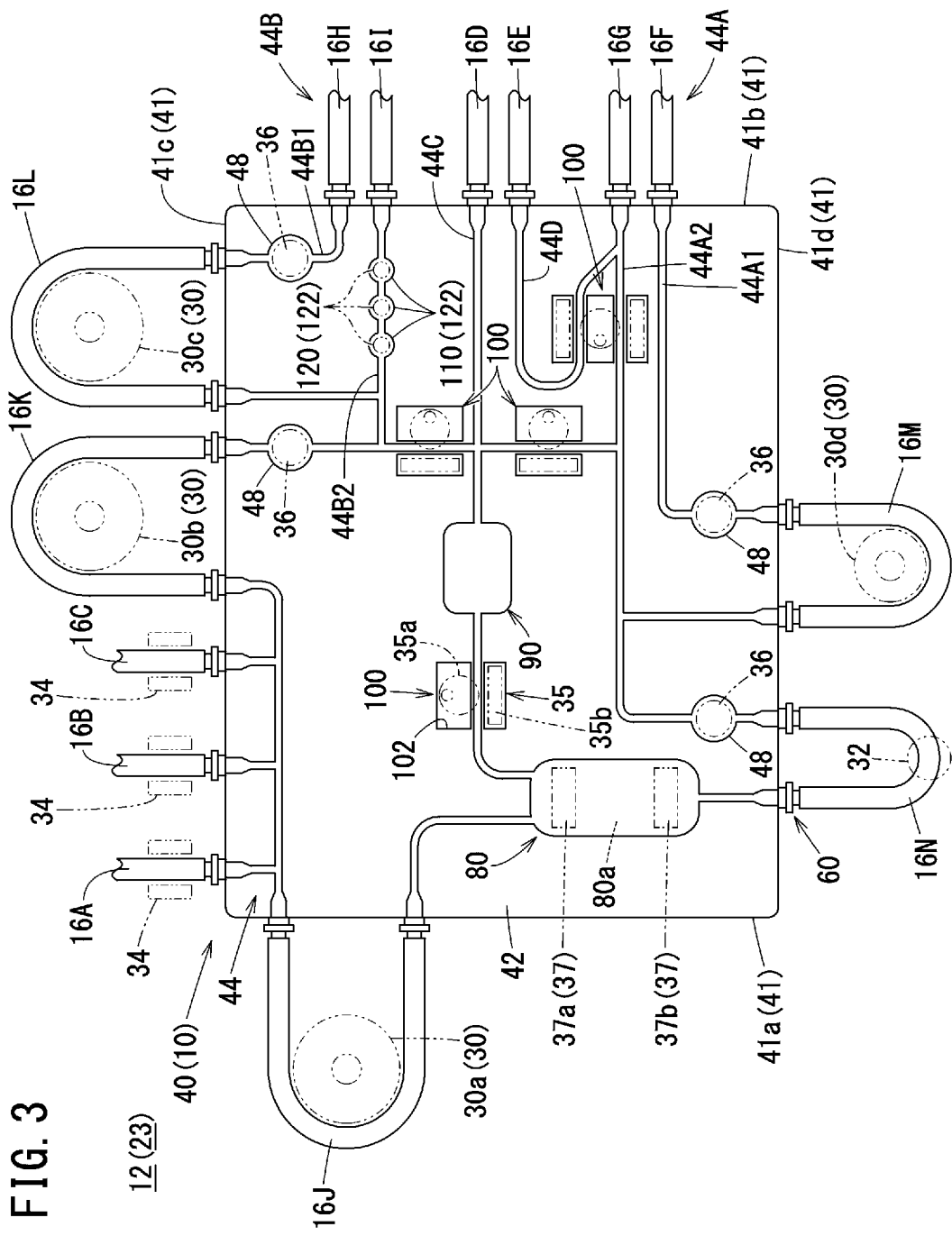
FIG. 3 is a plan view showing a cassette main body and a peripheral portion thereof.

In addition, the cassette 10 is set inside the cell expansion device 15 in a state where the cassette main body 40 and the frame 50 are integrated, and the planar direction of the cassette main body 40 is set in an upright posture along the direction of gravity (in the vertical direction). More specifically, in the interior of the cell expansion device 15, the cassette 10 is fixed to the cassette setting location of the cell expansion device 15 while being oriented in the vertical direction shown in FIG. 3. Moreover, the cassette 10 in FIG. 3 is shown in a posture as viewed from the side of the cover portion 54 (the side of a touch panel 134 of the cell expansion device 15) in a state of being mounted in the cell expansion device 15, and in order to simplify description, the frame 50 is omitted and only the cassette main body 40 is shown.

More specifically, the outer edges 41 of the cassette main body 40 are constituted by a first short side 41a (left side in the figure), a second short side 41b (right side in the figure), a first long side 41c (upper side in the figure), and a second long side 41d (lower side in the figure). The cell solution tube 16A, the cleaning solution tube 16B, and the culture medium tube 16C are connected to the first long side 41c. The waste liquid tube 16D, the collection tube 16E, the first IC tube 16F, the second IC tube 16G, the first EC tube 16H, and the second EC tube 16I are connected to the second short side 41b.

Further, in the cell expansion system 23, in the set state, four pumps 30 are arranged at positions in proximity to the sides of the cassette 10. More specifically, in the set state, the cell expansion device 15 includes a first pump 30a disposed in proximity to the first short side 41a, a second pump 30b and a third pump 30c disposed in proximity to the first long side 41c, and a fourth pump 30d disposed in proximity to the second long side 41d.

In the kit 12 (cassette 10), as closed tubes 16 corresponding to the first to fourth pumps 30a to 30d, the first pump tube 16J is connected to the first short side 41a, the second pump tube 16K and the third pump tube 16L are connected to the first long side 41c, and the fourth pump tube 16M is connected to the second long side 41d. The first to fourth pump tubes 16J to 16M are arranged in a manner so that the portions thereof that are folded back in an arcuate shape are wrapped around circular shaped wound portions of the first to fourth pumps 30a to 30d.

For example, by being rotated so as to squeeze the respective pump tubes 16J to 16M wrapped therearound, the first to fourth pumps 30a to 30d apply a fluid force to the liquids inside the pump tubes 16J to 16M. The first pump 30a causes the liquid to flow in an IC route 44A to be described later, and the second pump 30b causes the liquid to flow in an EC route 44B to be described later. Further, the third pump 30c circulates the liquid of the EC route 44B, and the fourth pump 30d circulates the liquid of the IC route 44A.

In the cell expansion system 23, in the set state, an air bubble sensor 32 is arranged at a position in the vicinity of the second long side 41d of the cassette main body 40. Therefore, in the kit 12, a sensor tube 16N in the form of a closed tube 16 is connected to the second long side 41d, and in the set state, the sensor tube 16N is arranged so as to face the air bubble sensor 32.

Furthermore, in the cell expansion system 23, in the set state, outer side clamps 34 are arranged respectively on the cell solution tube 16A, the cleaning solution tube 16B, and the culture medium tube 16C. The outer side clamps 34 open and close the respective flow paths of the tubes 16 under the control of the cell expansion device 15. Further still, in the set state, the cell expansion system 23 includes a plurality of inner side clamps 35 that open and close predetermined flow paths 44 provided in the cassette main body 40.

As noted previously, the flow paths 44 having predetermined shapes are formed inside the outer edges 41 of the cassette main body 40, and extend along the planar direction. Further, the cassette main body 40 has, provided on the sheets, a plurality of pressure detection parts (detected parts for pressure detection) 48 in communication with the flow paths 44, a liquid level detection part (a detected part for liquid level detection) 80, a check valve unit 90, and a plurality of flow path opening/closing units 100 and a plurality of target parameter detection parts (detected parts for target parameter detection) 110 configured together with the flow paths 44.

Although detailed description thereof is omitted, the flow paths 44 are constituted by an IC route 44A for supplying liquid to the inner cavities of the hollow fibers 24 together with the first and second IC tubes 16F and 16G, and an EC route 44B for supplying liquid to the outer side (the main space 26a) of the hollow fibers 24 together with the first and second EC tubes 16H and 16I. In particular, when the culture medium is supplied to the bioreactor 21, each of the plurality of outer side clamps 34 and the plurality of inner side clamps 35 is appropriately opened or closed, whereby the IC route 44A and the EC route 44B are placed in the state that is shown schematically in FIG. 4.

The IC route 44A includes inside the cassette main body 40 a first IC port path 44A1 in communication with the first IC tube 16F, and a second IC port path 44A2 in communication with the second IC tube 16G. In addition, in the IC route 44A, a circulation circuit 46A is formed that circulates liquid between the bioreactor 21 (inside the hollow fibers 24), the first and second IC port paths 44A1 and 44A2, and the first and second IC tubes 16F and 16G.

The EC route 44B includes inside the cassette main body 40 a first EC port path 44B1 in communication with the first EC tube 16H, and a second EC port path 44B2 in communication with the second EC tube 16I. In addition, in the EC route 44B, a circulation circuit 46B is formed that circulates liquid between the bioreactor 21 (outside the hollow fibers 24), the first and second EC port paths 44B1 and 44B2, and the first and second EC tubes 16H and 16I.

Returning to FIG. 3, the pressure detection parts 48 are provided on downstream sides of each of the pumps 30 in the IC route 44A and the EC route 44B. The pressure detection parts 48, by being arranged in facing relation to pressure sensors 36 provided in the cell expansion device 15, serve to detect the pressures in the flow paths 44. Further, the liquid level detection part 80 is provided in the IC route 44A, temporarily stores the flowing liquid in a storage space 80a, and causes the liquid to flow out to the IC route 44A, together with causing a gas to flow out to a route that differs from the route for the liquid. The liquid level detection part 80 is arranged so as to face toward liquid level sensors 37 (an upper sensor 37a and a lower sensor 37b) provided in the cell expansion device 15, and makes it possible to detect a liquid level of the liquid that is stored in the interior thereof. The check valve unit 90 is provided in the route from which the gas is allowed to flow out, and restricts inflowing of gas or liquid into the liquid level detection part 80 from such a route.

The flow path opening/closing units 100 are constituted from a plurality of notches 102, and are disposed respectively in the plurality of inner side clamps 35 of the cell expansion device 15. The inner side clamps 35 include displacement bodies 35a and fixed bodies 35b that are inserted into the notches 102, and by bringing the displacement bodies 35a in proximity to the fixed bodies 35b, close the predetermined flow paths 44, whereas by the displacement bodies 35a being made to separate away from the fixed bodies 35b, open the predetermined flow paths 44. In the flow paths 44 of the flow path opening/closing units 100, there are provided the aforementioned gas outflow route, the IC route 44A, a waste liquid route 44C from the EC route 44B to the waste liquid bag 18D, a collection route 44D from the IC route 44A to the collection bag 18E, and the second IC port path 44A2.

The target parameter detection parts 110 make it possible to detect parameters related to culturing of cells of the liquid that flows in the bioreactor 21. As the parameters related to culturing of cells, there may be cited, for example, an amount of dissolved oxygen, a pH, an amount of glucose, an amount of dissolved carbon dioxide, and an amount of lactic acid, of the liquid that flows in the flow paths 44. The amount of dissolved oxygen, the pH, and the amount of glucose correspond to the parameters of the culturing environment supplied to the cells. The amount of dissolved carbon dioxide and the amount of lactic acid correspond to parameters generated by the metabolism of the cells. One of the target parameter detection parts 110 makes it possible to detect any one of these five types of parameters.

More specifically, in the cell expansion system 23, the target parameter detection parts 110 provided in the cassette 10, and optical sensors 120 provided in the cell expansion device 15 jointly form culture parameter detection units 122 that detect parameters related to the cells at a time of cell culturing. The cell expansion system 23 (cell expansion device 15) adjusts (feeds back) the amounts of the culture medium and the gas component supplied to the bioreactor 21, on the basis of the detection results of the culture parameter detection units 122.

Additionally, according to the present embodiment, a plurality of (three) of the target parameter detection parts 110 are provided in the second EC port path 44B2, and are configured to detect different types of parameters, respectively. One of such parts is a lactic acid detection part (a detected part for lactic acid detection) 110a that detects an amount of lactic acid, and another one of such parts is a glucose detection part (a detected part for glucose detection) 110b that detects an amount of glucose. The three target parameter detection parts 110 are arranged alongside one another at equal intervals along the direction in which the second EC port path 44B2 extends. Moreover, the target parameter detection parts 110 may be provided with only the lactic acid detection part 110a, or five of such parts may be provided in order to detect all five types of parameters. Further, the target parameter detection parts 110 are not limited to being disposed in the second EC port path 44B2, and may be disposed in another one of the flow paths 44 (for example, the second IC port path 44A2).

As shown in FIG. 5A, each of the target parameter detection parts 110 includes a fluorescent chip 112 (chip 111), and in the set state, the target parameter detection parts 110 are arranged respectively at positions facing toward the optical sensors 120. The fluorescent chips 112 are configured so as to undergo coloring in response to a predetermined substance (any one of oxygen, $H^+$, $OH^-$, glucose, carbon dioxide, or lactic acid) contained in the liquid. Under the control of a control unit 136 of the cell expansion device 15, each of the optical sensors 120 emits toward each of the fluorescent chips 112 measurement light having a wavelength corresponding to the characteristics of the fluorescent chips 112, and receives excitation light generated from the fluorescent chips 112. Consequently, the optical sensors 120 transmit to the control unit 136 detection signals based on the degree of coloration of the fluorescent chips 112.

More specifically, as shown in FIG. 5B, the target parameter detection parts 110 include the above-described fluorescent chips 112 disposed inside the flow paths 44, and bulging portions 116 formed in the cassette main body 40 and in which the fluorescent chips 112 are accommodated. In the pair of resin sheets 42 that constitute the cassette main body 40, the fluorescent chips 112 are joined to a resin sheet 42a (on a side opposite from a resin sheet 42b on the side of the cover portion 54) which is in contact with a placement surface 15a of the cell expansion device 15.

The fluorescent chips 112 may adopt an appropriate laminated structure for the purpose of optically measuring the predetermined parameters (the amount of dissolved oxygen, the pH, the amount of glucose, the amount of dissolved carbon dioxide, the amount of lactic acid) related to culturing of cells. A predetermined layer of the fluorescent chips 112 (laminated structure) is a target detection layer that undergoes coloring in response to a predetermined substance contained in the culture medium. For example, a dye agent such as lactate dehydrogenase (LDH), peroxidase (POD), or the like is applied to the target detection layer of a fluorescent chip 112a of the lactic acid detection part 110a. Further, for example, a dye agent that primarily includes glucose oxidase (GOD), peroxidase (POD), glucose dehydrogenase (GDH), or the like is applied to the target detection layer of a fluorescent chip 112b of the glucose detection part 110b.

Further, the optical sensors 120, and placement recesses 124 are provided in portions in the cell expansion device 15 that constitute the culture parameter detection units 122. Each of the optical sensors 120 includes a light emitting unit 120a that emits measurement light having a predetermined wavelength, and a light receiving unit 120b that receives excitation light generated from the fluorescent chips 112, on the basis of the configuration (parameters) of the fluorescent chips 112. For example, an optical sensor 120 (an optical sensor 121A) facing toward the lactic acid detection part 110a receives excitation light from the fluorescent chip 112a, and outputs to the control unit 136 a detection signal related to the amount of lactic acid. Similarly, an optical sensor 120 (an optical sensor 121B) facing toward the glucose detection part 110b receives excitation light from the fluorescent chip 112b, and outputs to the control unit 136 a detection signal related to the amount of glucose.

Moreover, the means for detecting parameters in relation to cells (the amount of lactic acid and the amount of glucose contained within the culture medium) is not limited to optical measurement using the fluorescent chips 112 and the optical sensors 120, and various alternative detection means can be adopted therefor. For example, as another detection means, the cell expansion system 23 can employ an enzyme electrode method, in which electrons (a current value) generated by a substance that has reacted with an enzyme are detected. In this case, a configuration may be adopted in which, instead of the fluorescent chips 112, the target parameter detection parts 110 are equipped with electrodes (not shown) having enzymes, and in the set state, the terminals of the cell expansion device 15 are connected to the electrodes.

The placement recesses 124 are formed with a predetermined depth (a dimension shorter than a protruding amount of the bulging portions 116) from the placement surface 15a of the cell expansion device 15, and include the optical sensors 120 at bottom parts thereof. When the cassette 10 is set, the placement recesses 124 are capable of guiding the bulging portions 116 of the cassette main body 40 (the resin sheet 42a), whereby flat portions of the bulging portions 116 are placed on and brought into contact with the bottom parts thereof.

Returning to FIG. 1, the cell expansion device 15 in which the kit 12 is mounted is equipped with a box-shaped device main body 130, and a stand 132 on which the medical bags 18 of the kit 12 are retained. Further, a touch panel 134 (display operation unit) for carrying out operations and displays when the cell expansion process is performed is provided on an outer surface of the device main body 130. Furthermore, in the interior of the device main body 130, there are provided a cassette placement unit (not shown) in which the cassette 10 is fixed in an upright posture, and further, the bioreactor 21 is retained at an appropriate height, and the above-described control unit 136 that controls operation of the cell expansion system 23.

The control unit 136 includes a non-illustrated processor and an input/output interface, together with having a memory 136a, and by the processor executing a program (not shown) stored in the memory 136a, in the expansion process, the pumps 30, the outer side clamps 34, the inner side clamps 35, etc., are appropriately operated. Further, under the execution of the program at the time of cell culturing, the control unit 136 constructs a functional unit as shown in FIG. 6, receives detection signals from each of the optical sensors 120, and adjusts (feedback controls) driving of the pumps 30 on the basis of the detection results thereof.

In greater detail, in the interior of the control unit 136, there are constructed an input information acquisition unit 140, a lactic acid amount measurement control unit 142, a lactic acid amount calculation unit 144, a culture medium supply amount calculation unit 146, a cell number calculation unit 148, a pump control unit 150, a glucose amount measurement control unit 152, and a glucose amount calculation unit 154.

The input information acquisition unit 140 is connected to the touch panel 134, receives instruction information of an operator when the touch panel 134 is operated, and stores the instruction information in the memory 136a. The instruction information includes calibration information A indicative of a relationship between a state of the cells (the number of cells) and the amount of lactic acid. The control unit 136, by operation of a non-illustrated display control unit, displays on the touch panel 134 an appropriate guidance image, and stores in the memory 136a the calibration information A, which was input by the operator in accordance with the guidance image. Further, the calibration information A may be stored in the memory 136a by being downloaded through the Internet (not shown) or the like.

In this instance, the calibration information A is constructed as map information (or an approximate expression based on regression analysis) indicative of the relationship between the number of cells and the amount of lactic acid. The calibration information A is obtained by seeding the target cells to be cultured on a petri dish (culture bed) or the like and culturing the cells by supplying the culture medium, and measuring the number of cells that expand over time, and the amount of lactic acid released from the cells inside the petri dish. Moreover, concerning the calibration information A, in the case that the calibration information A of the target cells is already known in advance, it is not necessary to perform such a preliminary test. For example, even for cells having different DNA or the like, in the case of culturing cells in which the relationship between the amount of lactic acid released during culturing, and the number of cells that are expanded is almost the same, the calibration information A which is provided in advance may be used. Further, for example, in the case of culturing the same cells a plurality of times in the cell expansion system 23, the same calibration information A as in the first time may be used in the second time and thereafter.

The lactic acid amount measurement control unit 142 is connected to the optical sensor 121A, and carries out an optical measurement of the lactic acid detection part 110a by the optical sensor 121A at an appropriate timing. The timing at which the amount of lactic acid is detected is not particularly limited, but for example, the detection may be carried out in units of seconds or minutes. Upon receiving a detection signal (information of a light amount of the excitation light) which is obtained by optically measuring the lactic acid detection part 110a, the lactic acid amount measurement control unit 142 stores such information in the memory 136a as information in relation to the amount of lactic acid, and further, outputs the information to the lactic acid amount calculation unit 144.

The lactic acid amount calculation unit 144 calculates the amount of lactic acid from the information in relation to the amount of lactic acid acquired by the lactic acid amount measurement control unit 142, using an appropriate calculation formula or information of a calibration curve which is retained in advance. In the calculation of the amount of lactic acid, it is possible to calculate an absorbance from the information of the light amount of the excitation light, and to calculate the amount of lactic acid from the absorbance. Further, the lactic acid amount calculation unit 144 may implement an appropriate correction in relation to the amount of lactic acid of the calculation process, in accordance with the type of culture medium, other parameters, and the like. The lactic acid amount calculation unit 144 stores the calculated amount of lactic acid in the memory 136a, together with outputting the same to the cell number calculation unit 148.

In this instance, in the cell expansion system 23 according to the present embodiment, at the time of cell culturing (in a culturing step), a portion of the culture medium is guided into the waste liquid route 44C from the EC route 44B to thereby discharge the culture medium (see FIG. 4). Therefore, the lactic acid contained in the culture medium is also discarded from the EC route 44B together with the culture medium, and the amount of lactic acid contained in the culture medium that flows through the bioreactor 21 does not coincide with the actual number of cells. For this reason, when calculating the number of cells, the lactic acid amount calculation unit 144 performs a process of correcting the amount of lactic acid taking into consideration the discarded amount of the lactic acid.

More specifically, the control unit 136 includes the culture medium supply amount calculation unit 146, and calculates the supplied amount of the culture medium that is supplied to the bioreactor 21 from the culture medium bag 18C. This is because, by recognizing the supplied amount of the culture medium that is newly supplied to the culture medium circulating in the circulation circuits 46A and 46B, the outflowing amount of the culture medium that flows out (overflows) to the waste liquid route 44C can be estimated. Therefore, the culture medium supply amount calculation unit 146 acquires detection signals from encoders 31 that detect the rotational speeds of the pumps 30 provided in the cell expansion device 15 of the culture medium, detection signals from the pressure sensors 36, and the like, and using an appropriate calculation formula, calculates the supplied amount of the culture medium from these items of information. The supplied amount of the culture medium may also utilize values that are calculated in a driving control of the pumps 30 by the control unit 136.

Upon receiving the calculated supplied amount of the culture medium from the culture medium supply amount calculation unit 146, the lactic acid amount calculation unit 144 converts it into a discharged amount of the culture medium, and further corrects the amount of lactic acid that flows out to the waste liquid route 44C on the basis of the discharged amount of the culture medium. For example, it can be said that the total amount of the circulating culture medium is substantially constant, and the lactic acid contained in the culture medium that flows out from such a circulation also is discharged in accordance with the outflowing amount of the culture medium. However, since the amount (concentration) of the lactic acid with respect to the culture medium increases along with the passage of time, the lactic acid amount calculation unit 144 calculates the amount of lactic acid that flows out on the basis of the outflowing amount of the culture medium and the concentration of the lactic acid, and a correction process is performed to add an outflowing amount of the lactic acid corresponding to the outflowing amount of the culture medium. In accordance therewith, it is possible to satisfactorily calculate the total amount of the lactic acid at the time of the culturing step. Moreover, with a configuration in which the culture medium is not discharged in the culturing step, since it can be said that the amount of lactic acid and the number of cells are almost the same or substantially correspond to each other, such a correction process need not necessarily be performed.

On the other hand, the cell number calculation unit 148 calculates the number of cells based on the amount of lactic acid calculated by the lactic acid amount calculation unit 144, and the calibration information A retained by the input information acquisition unit 140. More specifically, since the calibration information A is information indicative of the relationship between the amount of lactic acid and the number of cells, if the amount of lactic acid is calculated, the control unit 136 can smoothly derive the number of cells.

Figure 7:
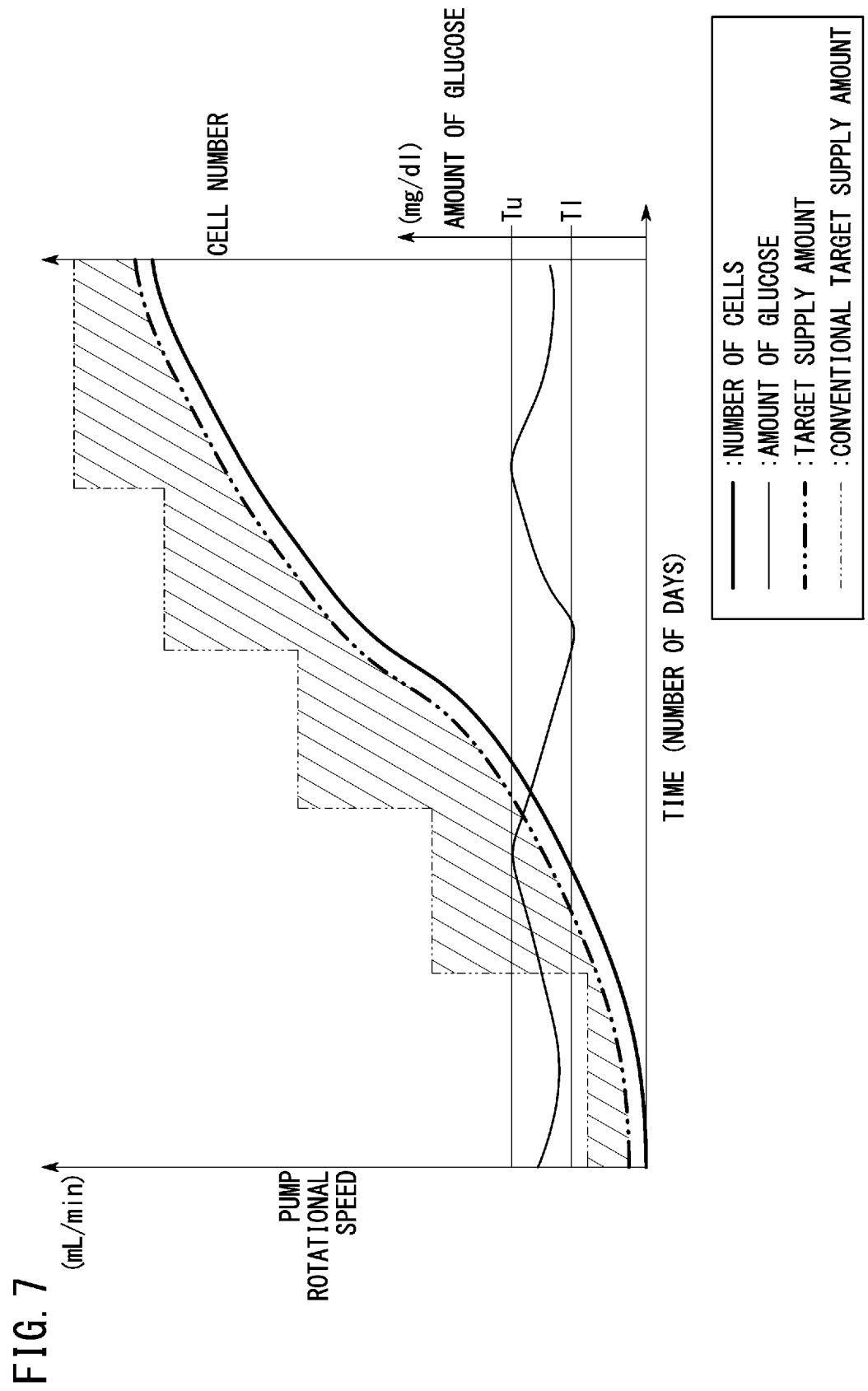
FIG. 7 is a graph showing a relationship between an elapse of time and a number of cells and a pump rotational speed at a time of cell culturing.

Since the cells that are cultured inside the bioreactor 21 expand due to cell division, as shown in the graph of FIG. 7, for example, the cells increase exponentially along with the passage of time (over a number of days). In the culturing step, the cell number calculation unit 148 is capable of monitoring (calculating) the number of cells in real time based on the amount of lactic acid. The cell number calculation unit 148 stores information of the calculated number of cells in the memory 136a, and outputs such information to the pump control unit 150.

Returning to FIG. 6, in the culturing step, the pump control unit 150 sets the target supply amount of the culture medium on the basis of the number of cells calculated by the cell number calculation unit 148, and controls the driving control of the pumps 30 of the cell expansion device 15. Further, the pump control unit 150 may be configured to perform a feedback control so as to, at the time of the driving control of the pumps 30, acquire the supplied amount of the culture medium calculated by the culture medium supply amount calculation unit 146, and cause it to approach the target supply amount.

Further, in setting the target supply amount of the culture medium, the pump control unit 150 according to the present embodiment sets the target supply amount using not only a calculation result of the number of cells based on the amount of lactic acid, but also a calculation result of the amount of glucose. Therefore, the control unit 136 calculates the amount of glucose by the glucose amount measurement control unit 152 and the glucose amount calculation unit 154, and outputs the calculated amount to the pump control unit 150.

The glucose amount measurement control unit 152 is connected to the optical sensor 121B, and carries out an optical measurement of the glucose detection part 110b by the optical sensor 121B at an appropriate timing. Upon receiving a detection signal (information of a light amount of the excitation light) which is obtained by optically measuring the glucose detection part 110b, the glucose amount measurement control unit 152 stores such information in the memory 136a as information in relation to the amount of glucose, and further, outputs the information to the glucose amount calculation unit 154.

The glucose amount calculation unit 154 calculates the amount of glucose from the information in relation to the amount of glucose acquired by the glucose amount measurement control unit 152, using an appropriate calculation formula or information of a calibration curve, which is retained in advance.

In addition, the pump control unit 150 sets the target supply amount of the culture medium based on the number of cells input from the cell number calculation unit 148, and the amount of glucose input from the glucose amount calculation unit 154. For example, in the case that the amount of glucose is greater than or equal to the upper limit threshold value Tu that is retained in advance, the pump control unit 150 sets the target supply amount of the culture medium to be low (placing priority on the amount of glucose) regardless of the calculated number of cells. On the other hand, in the case that the amount of glucose is less than or equal to the lower limit threshold value Tl that is retained in advance, the pump control unit 150 sets the target supply amount of the culture medium to be high regardless of the calculated number of cells.

On the other hand, in the case that the amount of glucose is lower than the upper limit threshold value Tu and is higher than the lower limit threshold value Tl, the pump control unit 150 sets the target supply amount corresponding to the number of cells. For example, the pump control unit 150 has retained therein in advance map information of the rotational speeds (the target supply amount) of the pumps 30 corresponding to the number of cells, and sets the rotational speeds of the pumps 30 based on the calculated number of cells.

In this instance, in a control according to a conventional cell expansion system, as shown by the thin two-dot dashed line in FIG. 7, the rotational speeds of the pumps 30 are increased in a stepwise manner along with the passage of time (over a number of days). Therefore, the culture medium is set to be supplied at a larger quantity than a quantity corresponding to the actual number of cells, and the culture medium is used in a wasteful manner.

In contrast thereto, in the cell culturing step, the cell expansion system 23 according to the present embodiment supplies the culture medium at a target supply amount that coincides with the number of cells based on the calculated number of cells. More specifically, as shown by the thick two-dot dashed line in FIG. 7, by increasing the target supply amount of the culture medium in real time as the number of cells increases, wasteful usage of the culture medium can be suppressed in comparison with a conventional target supply amount of the culture medium.

The biological component treatment system 22 (cell expansion system 23) and the biological component treatment device 14 (cell expansion device 15) according to the present embodiment are basically configured in the manner described above. Next, descriptions will be given below concerning operations thereof.

As shown in FIG. 1, in the expansion process of the cell expansion system 23, an operator inserts portions of the kit 12 including the cassette 10 into the cell expansion device 15. Further, the operator places the appropriate tubes 16 of the kit 12 on the pumps 30, the air bubble sensor 32, and the outer side clamps 34 of the cell expansion device 15. Furthermore, when the cassette 10 is arranged, the flow path opening/closing units 100 are arranged in the inner side clamps 35, and the target parameter detection parts 110 are arranged in the optical sensors 120 (the placement recesses 124). Consequently, as shown in FIG. 3, the cassette 10 is set in the cell expansion device 15 with the planar direction thereof being oriented in a posture along the direction of gravity. Furthermore, the medical bags 18 of the kit 12 are also suspended from the stand 132 by the operator.

After having been set, in the expansion process, a priming step, a culture medium replacement step, a seeding step, a culturing step, a releasing step, and a collecting step are sequentially performed. In the priming step, the cleaning solution in the cleaning solution bag 18B is made to flow through the two routes (the IC route 44A and the EC route 44B) inside the cassette 10, and the gas existing in the predetermined tubes 16, the bioreactor 21, and the respective routes of the cassette main body 40 is removed. Further, the gas that is removed is guided to the waste liquid bag 18D. In the culture medium replacement step, in the same manner as in the priming step, the culture medium in the culture medium bag 18C is guided into the respective routes of the predetermined tubes 16, the bioreactor 21, and the cassette main body 40, which are then filled with the culture medium.

Furthermore, in the seeding step, after having performed the culture medium replacement step, the cell solution of the cell solution bag 18A is supplied via the IC route 44A to the inner cavities of the hollow fibers 24 of the bioreactor 21, while the culture medium existing in the EC route 44B is circulated, and the gas component is supplied to the bioreactor 21.

In addition, in the culturing step after having performed the seeding step, as shown in FIG. 4, the culture medium is supplied from both the IC route 44A and the EC route 44B, and culturing of the cells that were seeded in the bioreactor 21 is carried out. The culturing step is carried out for a longer period of time (for example, over several days) in comparison with the other steps, whereby the cells on the inner peripheral surfaces of the hollow fibers 24 are made to expand. Moreover, in the cell expansion system 23, an operation of supplying the culture medium from the EC route 44B without using the IC route 44A may be carried out in the culturing step.

At the time of the culturing step, the cell expansion system 23 controls the supply of the culture medium on the basis of the lactic acid and the glucose contained in the culture medium. In greater detail, the cell culturing method is carried out in accordance with the procedure shown in FIG. 8.

In the cell culturing method, the operator of the cell expansion system 23 performs preliminary culturing of the target cells using a petri dish or the like (step S10: preliminary testing step). More specifically, the operator carries out seeding of the cells and supply of the culture medium with respect to the petri dish, detects the number of cells that expand over time, and the amount of lactic acid produced by such cells, and in relation to the cultured cells, creates the calibration information A indicative of the relationship between the amount of lactic acid and the number of cells.

After completion of the preliminary testing step, the cell expansion device 15 registers and sets the calibration information A that was obtained by the operator (step S11: calibration information acquisition step). At this time, the input information acquisition unit 140 displays an appropriate screen guidance for inputting the calibration information A by the operator. In should be noted that steps S10 and S11 (processing prior to the culturing step) can be carried out before the other steps (the priming step, the culture medium replacement step, and the seeding step).

In addition, based on an operation instruction from the operator, the cell expansion device 15 initiates the culturing step of supplying the culture medium from the culture medium bag 18C to the bioreactor 21. The lactic acid amount measurement control unit 142 controls operation of the optical sensor 121A, and carries out the optical measurement with respect to the lactic acid detection part 110a of the kit 12 (step S12: measurement step). Consequently, the lactic acid amount measurement control unit 142 acquires the detection signal (the information in relation to lactic acid) detected by the optical sensor 121A, and stores such information in the memory 136a.

Next, the lactic acid amount calculation unit 144 of the control unit 136 calculates the amount of lactic acid from the acquired information in relation to lactic acid (step S13: lactic acid amount calculation step). At the time of calculating the amount of lactic acid, the lactic acid amount calculation unit 144 calculates the amount of lactic acid to be discarded on the basis of the outflowing amount of the culture medium (the amount of the culture medium supplied from the culture medium bag 18C to the circulation circuits 46A and 46B), which flows out to the waste liquid route 44C as described above, and corrects the total amount of the lactic acid.

Thereafter, the cell number calculation unit 148 of the control unit 136 calculates the number of cells on the basis of the calculated amount of lactic acid, and the calibration information A that was stored in advance (step S14: cell number calculation step).

The pump control unit 150 of the control unit 136 sets the target supply amount of the culture medium on the basis of the calculated number of cells, calculates the rotational speeds of the pumps 30 in accordance with the target supply amount, and controls operation of the pumps 30 (step S15: operation control step). In the foregoing manner, at the time of setting the target supply amount based on the number of cells, the pump control unit 150 sets the target supply amount taking into consideration the amount of glucose calculated by the glucose amount measurement control unit 152 and the glucose amount calculation unit 154. Consequently, even if the metabolism of the cells fluctuates, an excess or deficiency of the culture medium with respect to the number of expanded cells can be eliminated.

Further, in the releasing step after having performed the culturing step, the releasing solution is supplied from the IC route 44A to thereby release the cells that were cultured (expanded) inside the bioreactor 21. Additionally, in the releasing step, a medium containing the gas component is circulated between the EC route 44B and the bioreactor 21. Furthermore, in the collecting step after having performed the releasing step, by supplying the culture medium to the IC route 44A, the cells that were released in the releasing step are made to flow out from the bioreactor 21 and are guided into the collection bag 18E. At this time, the culture medium and the gas component are also supplied through the EC route 44B.

By the aforementioned steps, the cell expansion system 23 can satisfactorily store the cells that were cultured in the bioreactor 21, in the collection bag 18E. Moreover, it should be noted that the present invention is not limited to the above-described embodiment, and various modifications can be adopted in accordance with the essence and gist of the present invention.

Technical concepts and effects that can be grasped from the above-described embodiments will be described below.

The first aspect of the present invention is the biological component treatment system 22, including the biological component kit 12 having the path through which the culture medium for culturing cells is allowed to flow, and the biological component treatment device 14 in which the biological component kit 12 is set, and which is configured to control the flowing state of the culture medium, wherein the biological component treatment device 14 includes the measurement unit (optical sensor 121A) that performs a measurement, with respect to the biological component kit 12, of information in relation to lactic acid contained in the culture medium, and the control unit 136 configured to calculate the number of cells during culturing of the cells on the basis of the information in relation to lactic acid obtained by the measurement of the measurement unit, and the calibration information A that is stored in advance, and further configured to control supply of the culture medium to the cells on the basis of the number of cells.

In the above-described biological component treatment system 22, by measuring the information in relation to lactic acid at the time of cell culturing, and calculating the number of cells on the basis of the information in relation to lactic acid, the culture medium can be appropriately supplied to the cells that are being expanded in real time. Consequently, the biological component treatment system 22 is capable of suppressing wasteful usage of the culture medium, and can significantly reduce manufacturing costs. Furthermore, the biological component treatment system 22 is capable of satisfactorily managing the expansion degree of the cells, and can stabilize the quality of the cultured product obtained by culturing.

Further, the control unit 136 calculates the amount of lactic acid based on the information in relation to lactic acid, and derives the number of cells corresponding to the amount of lactic acid from the calibration information A. By calculating the amount of lactic acid in this manner, the biological component treatment system 22 can more satisfactorily monitor the number of cells at the time of cell expansion.

Further, the biological component kit 12 includes the treatment unit 20 in which the cells are cultured, and the waste liquid route 44C that causes the culture medium to flow out from the treatment unit 20, and the control unit 136 corrects the amount of lactic acid by calculating an outflowing amount of the lactic acid that flows out together with the culture medium in the waste liquid route 44C. In accordance with such features, the biological component treatment system 22 is capable of accurately calculating the amount of lactic acid, and can satisfactorily derive a more accurate number of cells from the amount of lactic acid.

Further, the biological component kit 12 includes the circulation circuits 46A and 46B in which the culture medium is circulated between the biological component kit 12 and the treatment unit 20, and the waste liquid route 44C through which the culture medium is caused to flow out from the circulation circuits 46A and 46B, and the control unit 136 calculates the outflowing amount of the lactic acid that flows out from the circulation circuits 46A and 46B. In accordance with such features, the biological component treatment system 22 is capable of calculating the amount of lactic acid in the circulation circuits 46A and 46B taking into consideration the amount of lactic acid that flows out from the circulation circuits 46A and 46B, and can more accurately estimate the number of cells.

Further, the calibration information A is set beforehand based on an input operation of the operator to the biological component treatment device 14 before carrying out culturing of the cells. In accordance with this feature, the number of cells can be calculated from the information in relation to lactic acid on the basis of the calibration information A that was set by the operator, and the number of cells can be monitored in a more stable fashion.

Further, the biological component treatment device 14 includes the glucose measurement unit (optical sensor 121B) that performs a measurement, with respect to the biological component kit 12, of information in relation to glucose contained in the culture medium, and the control unit 136 calculates the amount of glucose based on the information in relation to glucose obtained by the measurement of the glucose measurement unit, and controls the supply of the culture medium to the cells on the basis of the amount of glucose. In accordance with such features, the biological component treatment system 22 can supply the culture medium to the cells with a supplied amount determined on the basis of the amount of glucose, and is capable of suppressing an insufficiency of glucose for the expanded cells.

In the case that the amount of glucose is greater than or equal to the upper limit threshold value Tu, the control unit 136 decreases the target supply amount of the culture medium regardless of the number of cells, whereas in the case that the amount of glucose is less than or equal to a lower limit threshold value Tl, the control unit 136 increases the target supply amount of the culture medium regardless of the number of cells. In accordance with such features, the biological component treatment system 22 places priority on a control corresponding to the detected amount of glucose, and for example, even if the metabolism of the cells changes, and an excess or deficiency in glucose is likely to occur with respect to the number of expanded cells, the culture medium can be appropriately supplied.

Further, the biological component kit 12 includes the biological component cassette 10 that is disposed between the treatment unit 20 and the medical bag 18 in which the culture medium is accommodated, and is set in the biological component treatment device 14, the biological component cassette 10 includes the flow paths 44 through which the culture medium flows, and further includes, in an intermediate location of the flow paths 44, a lactic acid detection part 110a that reacts with the lactic acid contained in the culture medium, and in the set state of the biological component cassette 10, the measurement unit (optical sensor 120) is disposed so as to face the lactic acid detection part 110a, and performs a measurement on the lactic acid detection part 110a. In accordance with such features, the biological component treatment system 22 can satisfactorily measure the information in relation to lactic acid.

The second aspect of the present invention is the biological component treatment device 14 in which the biological component kit 12 is set, the biological component kit having a path through which a culture medium for culturing cells is allowed to flow, the biological component treatment device being configured to control the flowing state of the culture medium, wherein the biological component treatment device 14 includes the measurement unit (optical sensor 121A) that performs a measurement, with respect to the biological component kit 12, of information in relation to lactic acid contained in the culture medium, and the control unit 136 configured to calculate the number of cells during culturing of the cells on the basis of the information in relation to lactic acid obtained by the measurement of the measurement unit, and the calibration information A that is stored in advance, and further configured to control supply of the culture medium to the cells on the basis of the number of cells. In accordance with such features, the biological component treatment device 14 is capable of satisfactorily monitoring the expansion condition and/or degree of the cells that are expanded in real time on the basis of the information in relation to lactic acid contained in the culture medium. In addition, by appropriately supplying the culture medium to the cells, the biological component treatment device 14 is capable of reducing manufacturing costs, together with stabilizing the quality of the cultured product obtained by culturing.

The third aspect of the present invention is the cell culturing method performed by the biological component treatment system 22, including the biological component kit 12 having the path through which the culture medium for culturing cells is capable of flowing, and the biological component treatment device 14 in which the biological component kit 12 is set, and which is configured to control the flowing state of the culture medium, wherein the cell culturing method includes the measurement step of performing, by the measurement unit (optical sensor 121A) of the biological component treatment device 14, a measurement, with respect to the biological component kit 12, of information in relation to lactic acid contained in the culture medium, the cell number calculation step of calculating, by the control unit 136 of the biological component treatment device 14, the number of cells during culturing of cells, on the basis of the information in relation to lactic acid obtained by the measurement of the measurement unit, and the calibration information A that is stored in advance, and the operation control step of controlling, by the control unit 136, supply of the culture medium to the cells on the basis of the number of cells. In accordance with such features, in the cell culturing method, it is possible to control the supply of the culture medium to the cells on the basis of the information in relation to lactic acid at the time of cell culturing, and product quality can be stabilized together with reducing manufacturing costs.

Moreover, the biological component treatment system 22 (the biological component treatment device 14 and the cell culturing method) need not necessarily be provided with a configuration (the culture parameter detection unit 122) that detects an amount of glucose. In this case, concerning the biological component treatment system 22, a configuration may be provided in which the rotational speeds of the pumps 30 (the target supply amount: the flow rate per unit time of the culture medium) are determined in advance corresponding to the number of cells, and the pumps 30 are operated based on signals from the culture parameter detection unit 122 that detects the amount of lactic acid.

What is claimed is:

1. A biological component treatment system, comprising:
a biological component kit having a treatment unit configured to culture cells, a culture medium path through which a culture medium for culturing cells is allowed to flow, and a waste liquid path configured to direct waste culture medium removed from the treatment unit to a waste liquid bag; and
a biological component treatment device in which the biological component kit is set, and which is configured to control flow of the culture medium,
wherein the biological component treatment device comprises:
a first optical sensor configured to output lactic acid information based on lactic acid contained in the culture medium,
a processor configured to execute a program stored in memory to:
calculate an amount of lactic acid in the culture medium based on the lactic acid information output from the first optical sensor;
calculate the amount of the waste culture medium based on the amount of culture medium flowing out to the waste liquid bag;
calculate a correction to the amount of lactic acid in the culture medium based on the amount of the waste culture medium to yield a corrected amount of lactic acid contained in the culture medium;
calculate a number of cells in culture based on the corrected amount of lactic acid, and on corresponding calibration information that is stored in advance; and
control supply of culture medium to the biological component kit based on the number of cells.

2. The biological component treatment system according to claim 1, wherein:
the biological component kit comprises a circulation circuit in which the culture medium is circulated through the biological component kit, and the waste liquid path through which the waste culture medium flows is connected to the circulation circuit; and
the processor is further configured to execute a program to calculate the amount of the waste culture medium based on culture medium flowing out of the circulation circuit.

3. The biological component treatment system according to claim 1, wherein the calibration information is set based on input of an operator.

4. The biological component treatment system according to claim 1, wherein:
the biological component treatment device further comprises a second optical sensor configured to output glucose information based on glucose contained in the culture medium; and
the processor is further configured to execute a program to calculate an amount of glucose based on the glucose information, and to control supply of the culture medium to the biological component kit based on the amount of glucose.

5. The biological component treatment system according to claim 4, wherein the processor is further configured to execute a program to decrease a target supply amount of the culture medium regardless of the number of cells when the amount of glucose is greater than or equal to an upper limit threshold value, and to execute a program to increase the target supply amount of the culture medium regardless of the number of cells when the amount of glucose is less than or equal to a lower limit threshold value.

6. The biological component treatment system according to claim 1, wherein:
   the biological component kit comprises a biological component cassette that is disposed between the treatment unit and a medical bag in which the culture medium is accommodated; and
   the biological component cassette includes the culture medium path through which the culture medium flows, and further includes, in an intermediate location of the path, the first optical sensor.

7. The biological component treatment system according to claim 1, further comprising:
   a second optical sensor configured to output glucose information indicative of an amount of glucose contained in the culture medium; and
   a pump configured to supply culture medium to the biological component kit, wherein the processor executes the program to:
   control, when the amount of glucose is between a lower limit threshold and an upper limit threshold, a rotational speed of the pump to supply the culture medium to the biological component kit based on a correspondence of rotational speeds of the pump to the number of cells; and
   control, when the amount of glucose is outside the lower and upper limit thresholds, the rotational speed of the pump to supply the culture medium without regard to the number of cells.

8. A cell culturing method performed by a biological component treatment system, the biological component treatment system comprising:
   a biological component kit having a treatment unit configured to culture cells, a culture medium path through which a culture medium for culturing cells is allowed to flow, and a waste liquid path configured to direct waste culture medium removed from the treatment unit to a waste liquid bag; and
   a biological component treatment device in which the biological component kit is set, and which is configured to control flow of the culture medium, wherein the biological component treatment device comprises:
   a first optical sensor configured to output lactic acid information based on lactic acid contained in the culture medium,
   wherein the cell culturing method comprises:
   culturing cells in the treatment unit;
   calculate an amount of lactic acid in the culture medium based on the lactic acid information output from the first optical sensor;
   calculate the amount of the waste culture medium based on the amount of culture medium flowing out to the waste liquid bag;
   calculate a correction to the amount of lactic acid in the culture medium based on the amount of the waste culture medium to yield a corrected amount of lactic acid contained in the culture medium;
   calculate a number of cells in culture based on the corrected amount of lactic acid, and based on corresponding calibration information that is stored in advance; and
   supplying culture medium to the biological component kit based on the number of cells.

* * * * *